US012606136B2

(12) United States Patent (10) Patent No.: US 12,606,136 B2
Weh et al. (45) Date of Patent: Apr. 21, 2026

(54) CUBOIDAL HYDRAULIC BLOCK FOR A HYDRAULIC UNIT OF A BRAKE PRESSURE CONTROL MECHANISM OF A HYDRAULIC VEHICLE BRAKE SYSTEM

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 352 days.

(21) Appl. No.: 18/255,755

(22) PCT Filed: Dec. 2, 2021

(86) PCT No.: PCT/EP2021/083958
§ 371 (c)(1),
(2) Date: Jun. 2, 2023

(87) PCT Pub. No.: WO2022/128507
PCT Pub. Date: Jun. 23, 2022

(65) Prior Publication Data
US 2024/0025384 A1 Jan. 25, 2024

(30) Foreign Application Priority Data
Dec. 17, 2020 (DE) ..................... 10 2020 216 113.5

(51) Int. Cl.
*B60T 8/36* (2006.01)
*B60T 17/04* (2006.01)

(52) U.S. Cl.
CPC .............. *B60T 8/368* (2013.01); *B60T 17/04* (2013.01); *B60Y 2400/81* (2013.01)

(58) Field of Classification Search
CPC ...... B60T 8/368; B60T 17/04; B60Y 2400/81
See application file for complete search history.

(56) References Cited

U.S. PATENT DOCUMENTS

| 5,244,262 | A | 9/1993 | Kehl et al. | |
| 9,022,489 | B2 * | 5/2015 | Weh .......................... | F15B 9/09 |
| | | | | 303/DIG. 10 |
| 9,404,514 | B2 * | 8/2016 | Weh ..................... | F15B 13/0803 |
| 9,517,757 | B2 * | 12/2016 | Schlitzkus .............. | B60T 8/368 |
| 9,592,808 | B2 * | 3/2017 | Schlitzkus ............ | B60T 11/165 |
| 9,688,256 | B2 * | 6/2017 | Weh ........................ | B60T 8/368 |
| 10,093,294 | B2 * | 10/2018 | Mayr ...................... | B60T 8/368 |

(Continued)

FOREIGN PATENT DOCUMENTS

| CN | 106458179 A | 2/2017 |
| CN | 108216178 A | 6/2018 |

(Continued)

OTHER PUBLICATIONS

International Search Report for PCT/EP2021/083958, Issued May 3, 2022.

*Primary Examiner* — Thomas W Irvin
(74) *Attorney, Agent, or Firm* — NORTON ROSE FULBRIGHT US LLP

(57) ABSTRACT
A space-saving bore arrangement in a hydraulic block of a brake pressure control mechanism of a slip-controlled hydraulic vehicle power brake system.

12 Claims, 4 Drawing Sheets

(56)                 References Cited

U.S. PATENT DOCUMENTS

| | | | | |
|---|---|---|---|---|
| 10,308,232 B2 * | 6/2019 | Mayr | B60T 8/368 |
| 10,507,811 B2 * | 12/2019 | Tandler | B60T 8/368 |
| 10,625,722 B2 * | 4/2020 | Weh | B60T 8/368 |
| 10,744,991 B2 * | 8/2020 | Mayr | B60T 8/368 |
| 10,780,868 B2 * | 9/2020 | Weh | B60T 8/368 |
| 11,014,544 B2 * | 5/2021 | Zander | B60T 17/043 |
| 11,052,888 B2 * | 7/2021 | Mayr | B60T 8/368 |
| 11,767,000 B2 * | 9/2023 | Weh | B60T 8/368 303/119.3 |
| 2015/0298675 A1 * | 10/2015 | Mayr | B60T 17/043 92/169.1 |
| 2015/0314760 A1 * | 11/2015 | Weh | B60T 8/368 137/884 |
| 2015/0321650 A1 * | 11/2015 | Schlitzkus | B60T 8/368 137/78.1 |
| 2015/0375723 A1 * | 12/2015 | Hurst | F04B 53/001 137/565.11 |
| 2016/0280197 A1 * | 9/2016 | Mayr | B60T 13/686 |
| 2017/0021813 A1 * | 1/2017 | Tandler | B60T 8/368 |
| 2017/0072925 A1 * | 3/2017 | Mayr | B60T 8/368 |
| 2018/0056955 A1 * | 3/2018 | Weh | F15B 13/0814 |
| 2019/0031164 A1 * | 1/2019 | Tandler | B60T 8/368 |
| 2020/0031327 A1 * | 1/2020 | Mayr | F16K 27/003 |
| 2021/0309197 A1 * | 10/2021 | Weh | B60T 8/368 |
| 2022/0097667 A1 * | 3/2022 | Roos | F15B 15/20 |
| 2023/0048099 A1 * | 2/2023 | Weh | B60T 8/368 |
| 2023/0192047 A1 * | 6/2023 | Weh | B60T 8/4266 303/115.2 |
| 2023/0256953 A1 * | 8/2023 | Weh | B60T 17/02 137/597 |
| 2023/0256954 A1 * | 8/2023 | Weh | B60T 17/04 137/597 |
| 2024/0116485 A1 * | 4/2024 | Weh | B60T 8/368 |

FOREIGN PATENT DOCUMENTS

| | | |
|---|---|---|
| DE | 102016202113 A1 | 8/2017 |
| DE | 202019101586 A1 | 5/2020 |
| WO | 2009051008 A1 | 4/2009 |
| WO | 2009051009 A1 | 4/2009 |
| WO | 2018166687 A1 | 9/2018 |
| WO | 2019105837 A1 | 6/2019 |

* cited by examiner

CUBOIDAL HYDRAULIC BLOCK FOR A HYDRAULIC UNIT OF A BRAKE PRESSURE CONTROL MECHANISM OF A HYDRAULIC VEHICLE BRAKE SYSTEM

FIELD

The present invention relates to a hydraulic block for a hydraulic unit of a brake pressure control mechanism of a hydraulic vehicle brake system. The hydraulic block is in particular provided for a vehicle brake system comprising an external power control and/or a slip control.

BACKGROUND INFORMATION

German Patent Application No. DE 10 2016 202 113 A1 describes a narrow, cuboidal hydraulic block for a hydraulic unit of a slip-controlled hydraulic vehicle power brake system, in which a master brake cylinder bore is provided such that it extends continuously from one narrow side to an opposite narrow side and a power cylinder bore extends perpendicular to the master brake cylinder bore likewise continuously through two opposite large sides of the hydraulic block. The conventional hydraulic block also comprises a blind hole as a receptacle for a pedal travel simulator. To generate power brake pressure, a power piston can be displaced in the power cylinder bore via a ball screw drive by means of an electric motor. The electric motor is disposed coaxially to the power cylinder bore on the outside of the hydraulic block and the ball screw drive is located (likewise coaxially to the electric motor and the power cylinder bore) between the electric motor and the power piston. The electric motor and the ball screw drive form a power drive, and together with the power piston and the power cylinder bore form a power brake pressure generator for the hydraulic vehicle brake system.

SUMMARY

A hydraulic block according to the present invention is provided for a hydraulic unit of a brake pressure control mechanism of a hydraulic vehicle brake system. The hydraulic block according to an example embodiment of the present invention is in particular provided for a vehicle brake system comprising a slip control system and/or a vehicle power brake system. Brake pressure control means the generation and control of a brake pressure in the vehicle brake system, in brake circuits of the vehicle brake system and/or in hydraulic wheel brakes of the vehicle brake system that are connected to the hydraulic block. It can in particular also include a slip control. Slip control systems are anti-lock braking systems, traction control systems and/or vehicle dynamics control systems, for example, for which the abbreviations ALS, TCS and/or VDC are commonly used. Slip control systems are well-known and will not be discussed here.

The hydraulic block is used for mechanical fastening and hydraulic interconnection of hydraulic components of the vehicle brake system, the brake pressure generation and/or the brake pressure control and/or the slip control. Such hydraulic components include solenoid valves, check valves, hydraulic accumulators, damper chambers and pressure sensors, among other things. The hydraulic components are fastened in receptacles in the hydraulic block, which are typically configured as cylindrical counterbores, blind holes or through-holes, in part with diameter gradations. "Interconnected" means that the receptacles or the hydraulic components fastened in them, are connected by lines in the hydraulic block in accordance with a hydraulic circuit diagram of the vehicle brake system. The lines are typically, but not necessarily, drilled into the hydraulic block.

The hydraulic block fitted with the hydraulic components of the vehicle brake system or its slip control system forms the hydraulic unit, wherein "fitted" means that the hydraulic components are fastened in the receptacles of the hydraulic block respectively provided for them.

The hydraulic block furthermore in particular comprises terminals for the brake lines which lead to hydraulic wheel brakes of the vehicle brake system. It can also comprise terminals for the brake lines coming from a master brake cylinder, but the master brake cylinder is preferably integrated into the hydraulic block; i.e. the hydraulic block comprises a master brake cylinder bore, for example.

The present invention is directed in particular to the arrangement of the hydraulic components or their receptacles and their hydraulic connection in the hydraulic block.

For a space-saving accommodation of inlet valves and/or outlet valves of the slip control, one example embodiment of the present invention provides that its receptacles in the hydraulic block are not disposed side by side in a straight line as usual, but with an additional offset transverse to their side-by-side arrangement in the hydraulic block. For example, receptacles for inlet valves are disposed alternately on two straight lines parallel to one another in the hydraulic block instead of on one straight line. And/or a receptacle for one outlet valve is disposed transversely offset to other receptacles for outlet valves in the hydraulic block which are disposed on a straight line, for example.

The hydraulic block according to an example embodiment of the present invention preferably comprises a master brake cylinder bore for axially displaceable accommodation of one or more master brake cylinder pistons for muscle power actuation of the vehicle brake system, a power cylinder bore for generating power brake pressure, and/or a simulator cylinder bore or a receptacle for a pedal travel simulator.

A brake fluid reservoir is mounted on a side of the hydraulic block which is referred to here as the upper side of the hydraulic block and is preferably a narrow side of the hydraulic block. For this purpose, the hydraulic block comprises one or more connectors for the brake fluid reservoir in the upper side. For fastening the brake fluid reservoir to the upper side of the hydraulic block, one embodiment of the present invention provides a depression in a side of the hydraulic block adjoining said upper side that extends to the upper side. A fastening tab which protrudes from an underside of the brake fluid reservoir, for example, projects into the depression, and can be fixed in the depression, for instance with a screw, without a screw head or another part of the fastener projecting beyond a surface of the adjoining side of the hydraulic block. This does not impede insertion of an electrical plug provided on the adjoining side for contacting a control unit of the brake pressure control.

For connection to the power cylinder bore, one example embodiment of the present invention provides a line in the hydraulic block which leads from one of the connectors for the brake fluid reservoir in the upper side to the power cylinder bore. This line extends axially or axially parallel from the one connector of the brake fluid reservoir to the power cylinder bore, along which, after a bend, it extends parallel on the outside and, with a further bend, opens into the power cylinder bore. The power cylinder bore can thus be connected to the brake fluid reservoir with just a few bends. In the line, in particular in the connector and directly after the connector for the brake fluid reservoir, a check valve through which flow can pass in the direction of the power cylinder bore can be provided.

Further developments and advantageous embodiments of the present invention are disclosed herein.

Through-holes or blind holes referred to here as "lines" or "bores" or "cylinder bores" can also be produced in a manner other than drilling.

All features disclosed in the description herein and the figures can be implemented individually or in fundamentally any combination in embodiments of the present invention. Embodiments of the present invention which do not comprise all but only one or more features of an embodiment of the present invention are possible in principle. Possible are in particular also embodiments of the present invention in which the receptacles for the inlet valves and/or the receptacles for the outlet valves are disposed otherwise than as stated herein.

BRIEF DESCRIPTION OF THE DRAWINGS

The present invention is explained in more detail in the following with reference to an example embodiment shown in the figures.

DETAILED DESCRIPTION OF EXAMPLE EMBODIMENTS

Figure 1:
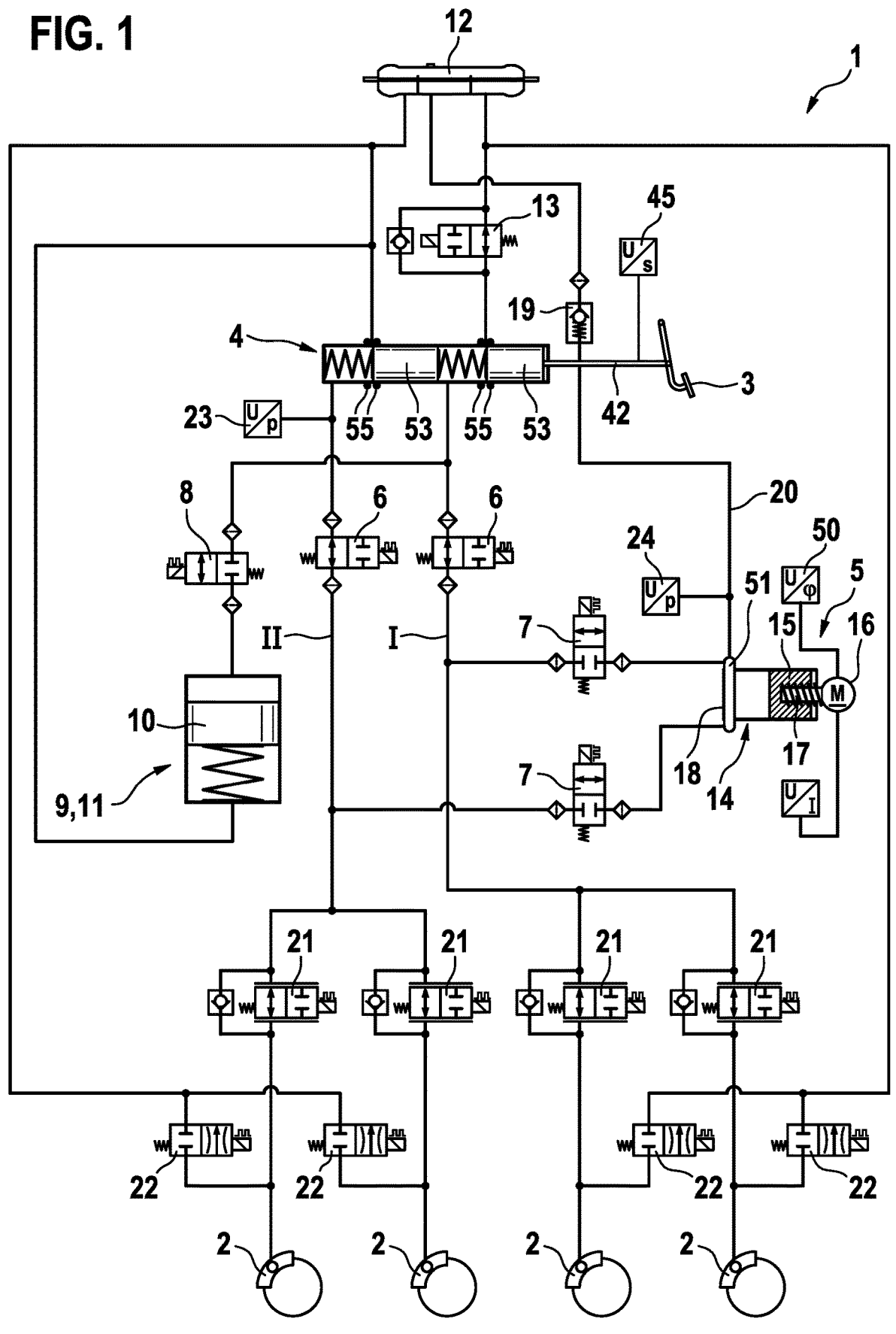
FIG. 1 shows a hydraulic circuit diagram of a vehicle power brake system comprising a slip control, according to an example embodiment of the present invention.

FIG. 1 shows a hydraulic multi-circuit, specifically dual circuit vehicle power brake system 1 comprising two brake circuits I, II and four hydraulic wheel brakes 2, of which two are respectively connected to a brake circuit I, II. The vehicle brake system 1 comprises a dual circuit master brake cylinder 4 that can be actuated with muscle power using a foot brake pedal 3 and a power brake pressure generator 5. The two brake circuits I, II are hydraulically connected in parallel to the master brake cylinder 4 and to the power brake pressure generator 5, wherein each brake circuit I, II is connected to the master brake cylinder 4 via a respective separator valve 6 and to the power brake pressure generator 5 via a respective power valve 7.

In one of the two brake circuits I, i.e., to one chamber of the dual circuit master brake cylinder 4, a piston cylinder unit 9 comprising a spring-loaded piston 10 is connected via a simulator valve 8 as a pedal travel simulator 11.

The master brake cylinder 4 comprises an unpressurized brake fluid reservoir 12, to which the two chambers or brake circuits I, II of the master brake cylinder 4 are connected. One of the two chambers of the master brake cylinder 4 is connected to the brake fluid reservoir 12 via a test valve 13 and hydraulically in parallel via a check valve through which flow can pass in the direction of the master brake cylinder 4, and the other chamber of the master brake cylinder 4 is connected directly to the brake fluid reservoir.

The power brake pressure generator 5 comprises a piston cylinder unit 14, the piston 15 of which can be displaced in a cylinder 18 of the piston cylinder unit 14 via a screw drive 17 by means of an electric motor 16 to generate power brake pressure. The two brake circuits I, II of the vehicle brake system 1 are connected to the cylinder 18 of the power brake pressure generator 5 via the two power valves 7.

The cylinder 18 of the piston cylinder unit 14 of the power brake pressure generator 5 is connected to the brake fluid reservoir 12 via a check valve 19 through which flow can pass in the direction of the cylinder 18 and is connected to the brake fluid reservoir 12 directly by a line 20 without the interposition of a valve. At the beginning of its displacement, the piston 10 of the power brake pressure generator 5 passes over a mouth of this line 20 so that, when the power brake pressure generator 5 is actuated, the piston cylinder unit 14 of the power brake pressure generator 5 is hydraulically separated from the brake fluid reservoir 12.

Each wheel brake 2 is connected to one of the two brake circuits I, II via an inlet valve 21 and to the unpressurized brake fluid reservoir 12 via an outlet valve 22.

The power brake pressure generator 5, the inlet valves 21 and the outlet valves 22 form brake pressure control valve assemblies that are capable of carrying out wheel-specific slip control, such as antilock control, traction slip control, and vehicle dynamics control. These slip controls are typically abbreviated as ALS, TCS, and VDC. Such slip controls are well-known and will not be discussed here.

In the illustrated and described embodiment of the present invention, the separator valves 6, the power valves 7, the simulator valve 8, the test valve 13, the inlet valves 21 and the outlet valves 22 are 2/2-way solenoid valves, wherein the separator valves 6, the test valve 13, and the inlet valves 21 are open in their currentless home positions, and the power valves 7, the simulator valve 8 and the outlet valves 22 are closed in their currentless home positions.

Pressure sensors 23, 24 are connected to one of the two chambers of the master brake cylinder 4 and to the cylinder 18 of the power brake pressure generator 5. A displacement or position sensor 45 for measuring a piston or pedal displacement or a piston or pedal position of the master brake cylinder piston 53 or the foot brake pedal 3 is disposed on a pedal rod connecting the foot brake pedal 3 to a master brake cylinder piston 53.

Service braking takes place as power braking with the power brake pressure generator 5. For this purpose, the power valves 6 are opened and a brake pressure is generated with the power brake pressure generator 5, which acts upon the wheel brakes 2 via the open inlet valves 21 thus actuating said wheel brakes.

During service braking, the master brake cylinder 4 is hydraulically separated from the brake circuits I, II by closing the separator valves 6. It serves as a setpoint generator for the brake pressure to be generated with the power brake pressure generator 5. The simulator valve 8 is opened during service braking, so that the master brake cylinder 4 can displace brake fluid in the pedal travel simulator 11 and piston and pedal displacement on the master brake cylinder 4 are possible.

In the event of a malfunction or failure of the power brake pressure generator 5, auxiliary braking by muscle power actuation of the master brake cylinder 4 is possible, wherein the separator valves 6 remain open and the power valves 7 remain closed.

Figure 2:
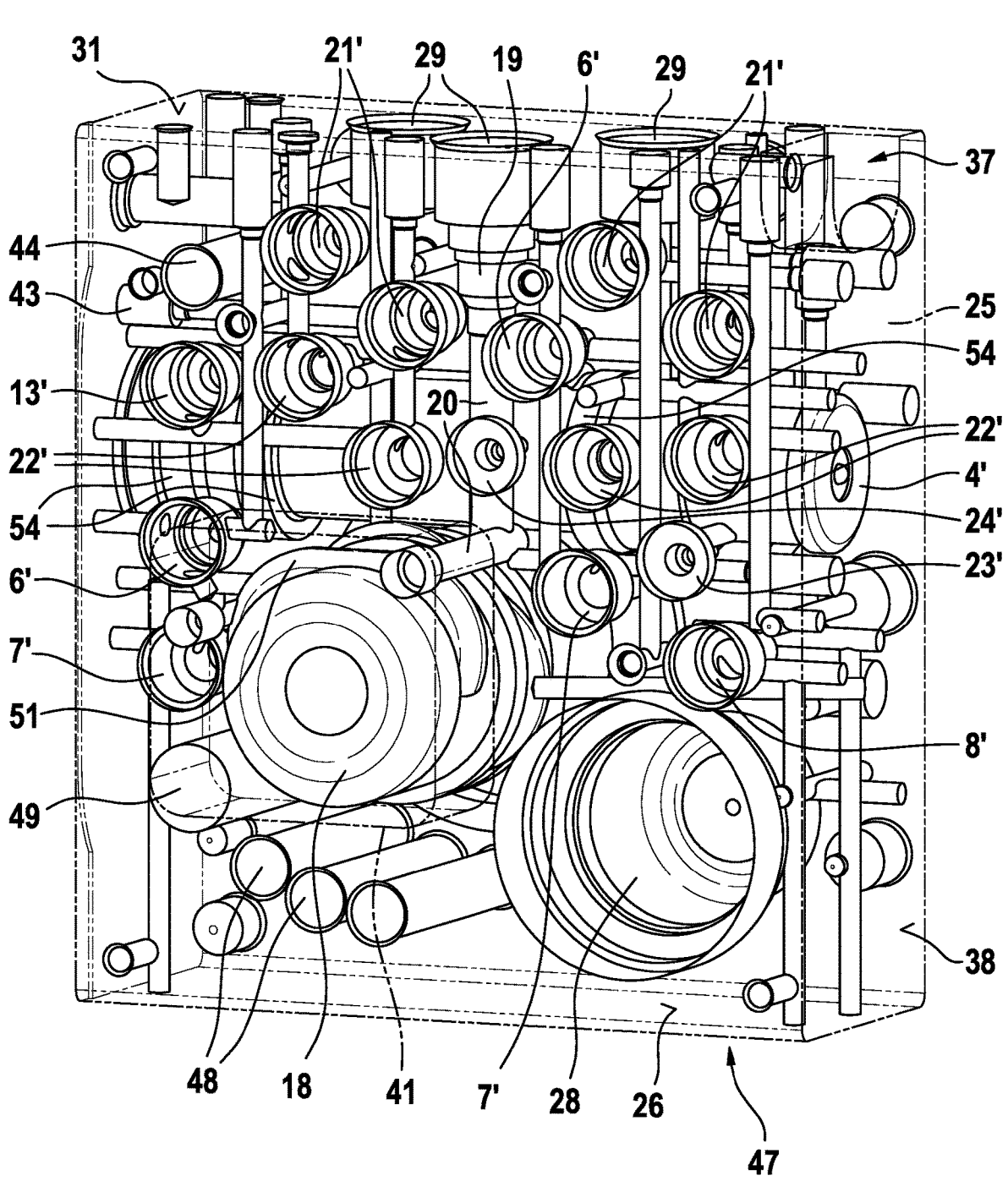
FIG. 2 shows a hydraulic block according to an example embodiment of the present invention in a perspective view looking onto a valve side of the hydraulic block.
Figure 3:
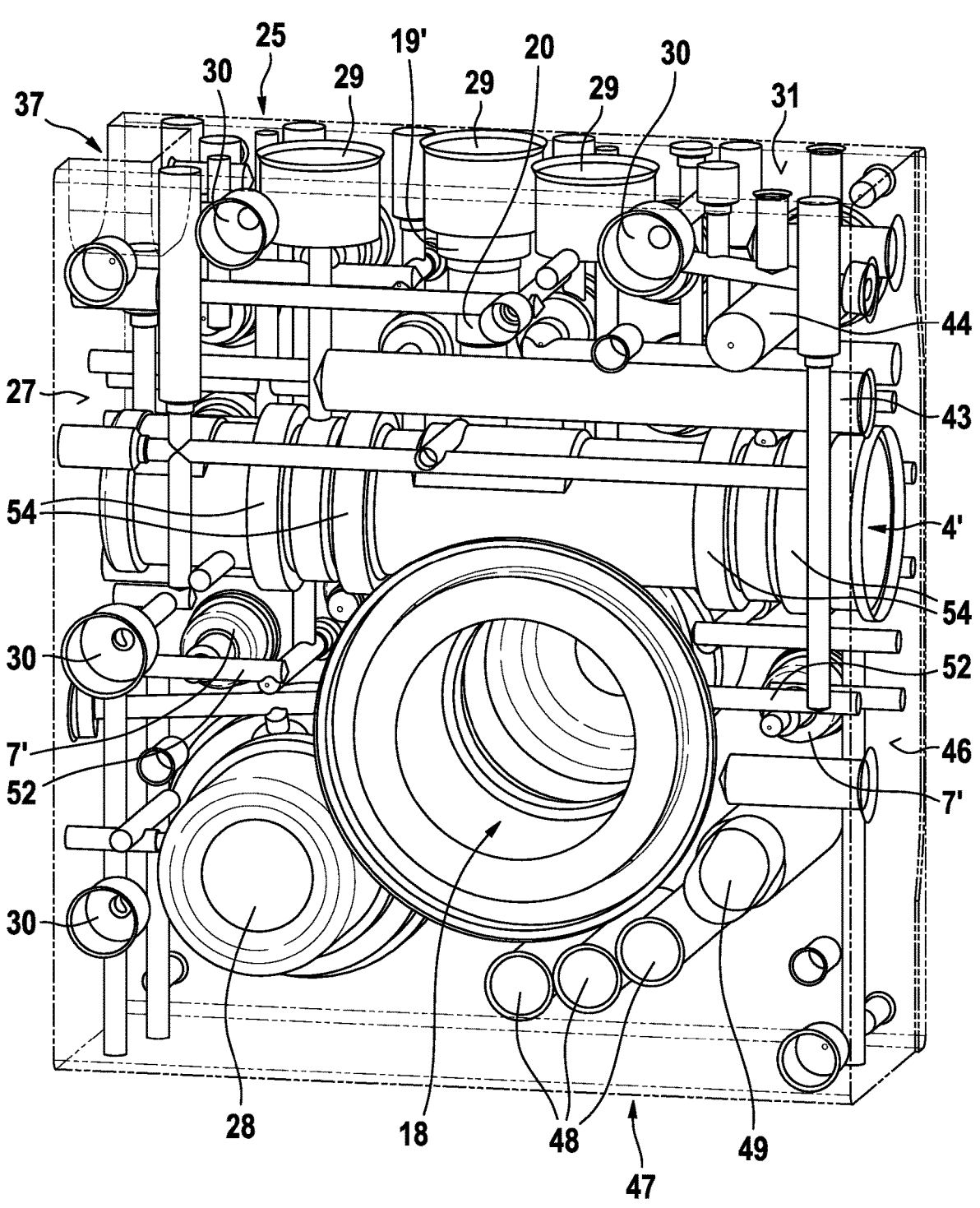
FIG. 3 shows the hydraulic block of FIG. 2 looking onto an opposite motor side of the hydraulic block.
Figure 4:
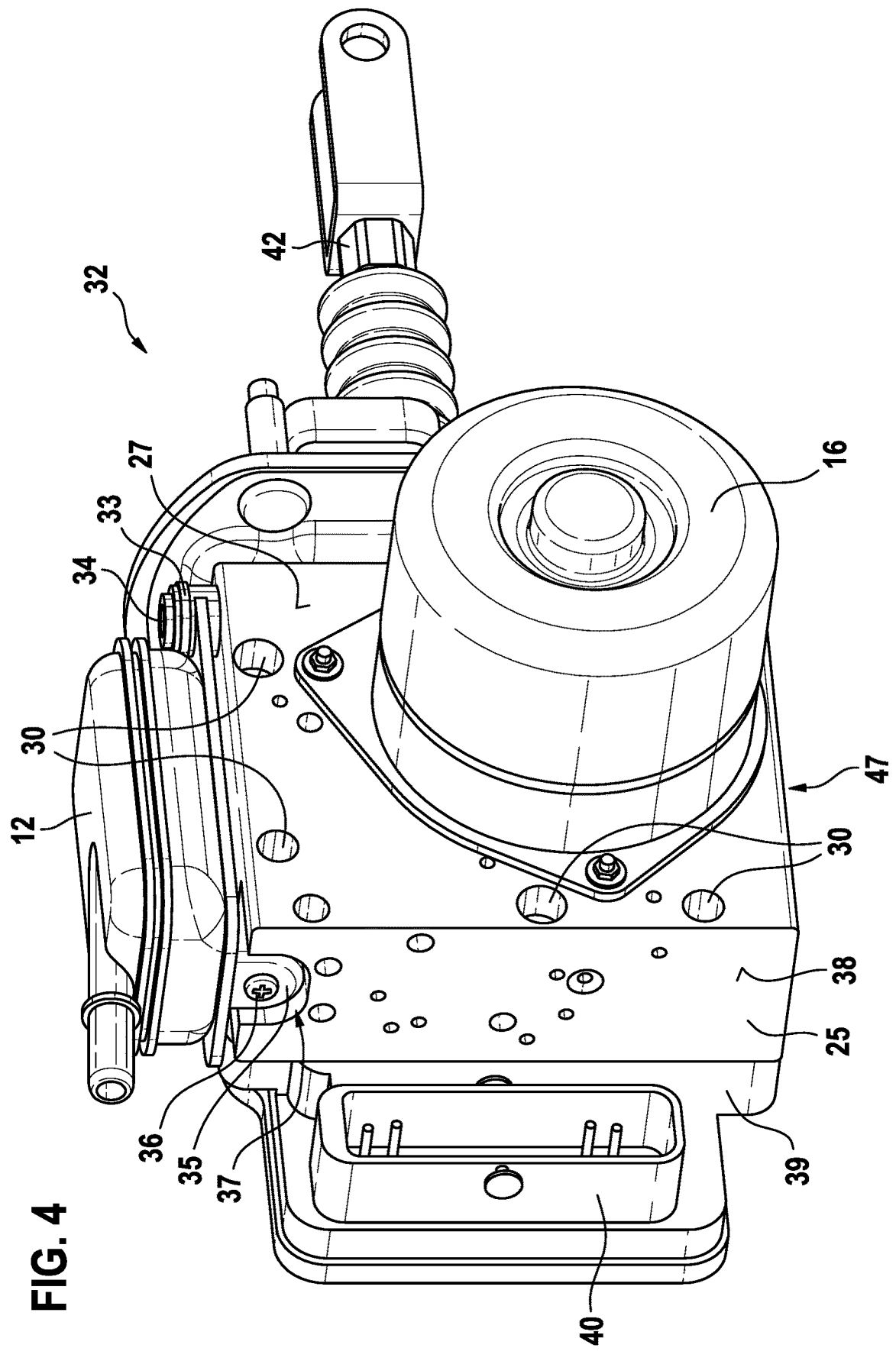
FIG. 4 shows a hydraulic unit comprising the hydraulic block of FIGS. 2 and 3 in a perspective view looking onto the motor side.

The hydraulic components of the vehicle brake system 1 are disposed in and on a hydraulic block 25 which is shown in FIGS. 2 and 3. The hydraulic block 25 is drawn transparently so that its bore arrangement can be seen. FIG. 2 shows a valve side 26 and FIG. 3 shows an opposite motor side 27 of the hydraulic block 25. In this embodiment example, the hydraulic block 25 is a flat, cuboid metal block used for mechanical fastening and hydraulic interconnection of the hydraulic components of the vehicle brake system 1. The hydraulic block 25 fitted with the hydraulic components forms a hydraulic unit 32 of the vehicle brake system 1, which is shown in FIG. 4 in a perspective view looking onto the motor side 27. "Flat" means that hydraulic block 25 is about 3 to 4 times as wide or long as it is thick. Two opposite large sides of the hydraulic block 25 in this embodiment example are nearly square and form the valve side 26 and the motor side 27.

In the hydraulic block 25, a master brake cylinder bore 4' which forms the master brake cylinder 4, a power cylinder bore which forms the cylinder 18 of the power brake pressure generator 5, a cylinder bore 28 which forms the cylinder of the piston cylinder unit 9 of the pedal travel simulator 11, receptacles for the solenoid valves 6, 7, 8, 13, 21, 22, a receptacle for the check valve 19, receptacles for the pressure sensors 23, 24, connectors 29 for the brake fluid reservoir 12 and connectors 30 for the hydraulic wheel brakes 2 are attached to the hydraulic block 25 by means of brake lines. The receptacles for the solenoid valves, the check valve and the pressure sensors are provided in FIGS. 2 and 3 with the same reference numbers as the respective hydraulic components in FIG. 1 with the addition of a "'".

The receptacles are cylindrical, partly diameter-stepped counterbores or blind holes in the hydraulic block 25. The hydraulic components are placed into the receptacles and are caulked all around to be made pressure-tight. Hydraulic sections of the solenoid valves that form the actual valves are located in the receptacles, and armatures and solenoid coils housed in a valve dome, project from the valve side 26 of the hydraulic block 1. The connectors 29 for the brake fluid reservoir 12 are also blind holes into which connecting nipples that project from a base of the brake fluid reservoir 12 are inserted and sealed with sealing rings. The connection bores 30 for the wheel brakes 2 are likewise blind holes in which the brake lines leading to the wheel brakes 2 are fastened in a pressure-tight manner with not-depicted press-in nipples using so-called self-clinch technology. It is also possible to connect the brake lines with screw nipples, for example. Lines configured in the hydraulic block 1 as bores connect the cylinder bores, the receptacles for the hydraulic components and the connectors 29, 30 for the brake fluid reservoir 12 and the wheel brakes 2 to one another in accordance with the hydraulic circuit diagram in FIG. 1.

"Drilled" or "bore arrangement" refers to the cylinder bores, receptacles for the solenoid valves and connection bores provided in the hydraulic block 1, as well as the bores forming lines that connect them in accordance with the hydraulic circuit diagram. The hydraulic block 25 is drilled in a Cartesian configuration, i.e. the bores, receptacles, connectors, lines, etc. are provided in the hydraulic block 25 parallel and perpendicular to one another and to the sides and edges of the hydraulic block 25. This does not exclude individual, obliquely extending lines and bores. "Fitted" means that the hydraulic components are disposed in their receptacles.

The brake fluid reservoir 12 is placed on an upper side 31 of the hydraulic block 25 adjoining the valve side 26 and the motor side 27 such that the connecting nipples on the base of the brake fluid reservoir 12 are inserted in the connectors 29 in the upper side 31 of the hydraulic block 25. The brake fluid reservoir 12 comprises three chambers, two of which are connected to the two chambers of the master brake cylinder 4 and one of which is connected to the cylinder 18 of the piston cylinder unit 14 of the power brake pressure generator 5 via the check valve 19 and the line 20. The connectors 29 are disposed in a longitudinal direction of the upper side 31 of the hydraulic block 25 one behind the other and in somewhat of a V-shape; i.e. a middle one of the three connectors 29 is disposed offset to the two other connectors 29 in the upper side 31 of the hydraulic block 25 transverse to the upper side 31.

The brake fluid reservoir 12 comprises two eye shackles 33 at which it is fastened on the upper side 31 of the hydraulic block with shoulder screws 34 and an eye shackle 35 which projects for the base and at which it is fastened on the hydraulic block with a stud bolt 36 (FIG. 4). The stud bolt 36 enables length compensation in the event of thermal expansion of the hydraulic block 25. The eye shackle 35 is located in a depression 37 in a side 38 of the hydraulic block 25 adjoining the upper side 31, the valve side 26 and the motor side 27, which extends to the upper side 31. A screw head of the stud bolt 36 is countersunk in the depression 37 as well, so that nothing projects on the side 38.

On the valve side 26 of the hydraulic block 25, a control unit cover 39 with an electronic control unit for the brake pressure control mechanism is disposed, which comprises a multipolar electric coupling 40 located on the side 38 of the hydraulic block 25. Due to the countersunk arrangement of the eye shackle of the brake fluid reservoir 12 together with stud bolt 36 in the depression 37, the eye shackle 35 and the stud bolt 36 do not impede insertion and removal of a not-depicted plug in the coupling 40.

The master brake cylinder bore 4' forming the master brake cylinder 4 is provided in the hydraulic block 25 with a spacing from the upper side 31 and parallel to the upper side 31, the valve side 26 and the motor side 27 above a center of the hydraulic block 25.

The cylinder 18 of the piston cylinder unit 14 of the power brake pressure generator 5 is mounted in the hydraulic block 25 in the motor side 27 perpendicular to the valve side 26 and the motor side 27. An elevation 41 into which the cylinder 18 of the power brake pressure generator 5 extends projects from the hydraulic block 25 from the valve side 26. The cylinder 18 of the piston cylinder unit 14 of the power brake pressure generator 5 is mounted in the hydraulic block 25 perpendicular to the master brake cylinder bore 4' and directly adjacent to the master brake cylinder bore 4'. "Directly adjacent" means that there is no hollow space in the hydraulic block 25 between the cylinder 18 of the piston cylinder unit 14 of the power brake pressure generator 5 and the master brake cylinder bore 4'.

The cylinder 18 of the piston cylinder unit 14 of the power brake pressure generator 5 is connected as stated to the center connector 29 of the brake fluid reservoir 12 via the check valve 19. For this purpose, the line 20 leads coaxially from a base of the connector 29 to close to a perimeter of the cylinder 18, from where, with a right angle bend, the line 20 leads axially parallel to the cylinder 18 along the outside of the cylinder 18 in the elevation 41 and opens into the cylinder 18 with a recess 51. The recess 51 is a type of peripheral groove in the cylinder 18 of the power brake pressure generator 5 that extends only over a part of a perimeter of the cylinder 18. It can also be implemented such that it extends all the way around. The recess 51 can generally also be understood as a bend through which the line 20 opens into the cylinder 18. At the base of the connector 29, the check valve 19 is disposed in a diameter widening of the line 20 that forms a receptacle 19' for the check valve 19.

The cylinder bore 28 of the pedal travel simulator 11 is provided vertically in the valve side 26 of the hydraulic block 25 directly adjacent to the cylinder 18 of the power brake pressure generator 5 between the cylinder 18 of the piston cylinder unit 14 of the power brake pressure generator 5 and a corner of the hydraulic block 25. "Directly adjacent" means that there is no hollow space in the hydraulic block 25 between the cylinder bore 28 of the pedal travel simulator 11 and the cylinder 18 of the power brake pressure generator 5.

Parallel to and close to the master brake cylinder bore 4', the hydraulic block 25 comprises a significantly thinner bore as a position indicator bore 43 for a master brake cylinder piston (primary or rod piston) 53. The position indicator bore 43 opens on the same side, in this embodiment example on the fastening side 46 of the hydraulic block 25, as the master brake cylinder bore 4'. A rod-shaped indicator holder mounted outside the hydraulic block 25 on a piston rod 42 connected to the master brake cylinder piston 53 (not shown) plunges into the position indicator bore 43, so that the indicator holder moves with the master brake cylinder piston 53. A permanent magnet, for instance, is fastened to the indicator holder as a signal generator located in the position indicator bore 43.

A blind hole is provided in the hydraulic block 25 perpendicular to the position indicator bore 43 as a receptacle 44 for the displacement or position sensor 45. The receptacle 44 is located above, i.e. on a side of the position indicator bore 43 facing the upper side 31 of the hydraulic block 25, and close to the mouth of the position indicator bore 43 or close to the mouth of the master brake cylinder bore 4' or close to the fastening side 46 of the hydraulic block 25.

The master brake cylinder 4 and the position indicator bore 43 are open on a fastening side 46 of the hydraulic block 25 which adjoins the valve side 26, the motor side 27 and the upper side 31 and faces the side 38 comprising the depression 37. The hydraulic block 25 is fastened with the fastening side 46 to a not-depicted bulkhead of a motor vehicle such that the upper side 31 with the brake fluid reservoir 12 is at the top.

The electric motor 16 is disposed on the outside of the motor side 27 of the hydraulic block 25 coaxially with the cylinder 18 of the piston cylinder unit 14 of the power brake pressure generator 5. A not-depicted planetary gear as a reduction gear and a ball screw drive for converting a rotational driving of the electric motor 16 into a translational movement for displacing the piston 15 of the piston cylinder unit 14 of the power brake pressure generator 5 are disposed coaxially with the electric motor 16 and the cylinder 18 in a motor housing of the electric motor 16 and in the cylinder 18 of the power brake pressure generator 5.

Three through-holes which extend from the valve side 26 to the motor side 27 are provided in the hydraulic block 25 between the cylinder 18 of the piston cylinder unit 14 of the power brake pressure generator 5 and an underside 47 of the hydraulic block opposite to the upper side 31 as motor connection bores 48 for supplying power to the electric motor 16 of the power brake pressure generator 5. The motor connection bores 48 are provided in the hydraulic block 25 on an imaginary arc around the cylinder 18 between the cylinder 18 and the underside 47.

The hydraulic block 25 also has a signal bore 49 for control lines and/or signal lines to or from the electric motor 16. A rotation angle sensor 50 of the electric motor 16, for instance, can be connected to the electronic control unit disposed in the control unit cover 39 on the valve side 26 of the hydraulic block 25 via said signal bore 49. The signal bore 49 extends through from the valve side 26 to the motor side 27 and is disposed between the cylinder 18 of the power brake pressure generator 5 and a corner of the hydraulic block 25 between the fastening side 46 and the underside 47 of the hydraulic block 25.

The receptacles for the solenoid valves are disposed in the valve side 26 of the hydraulic block 25. The receptacles 21' for the inlet valves 21 are provided side by side between a base of the connectors 29 for the brake fluid reservoir 12 and the master brake cylinder bore 4' and alternately with an offset of slightly less than their diameter in the direction of the upper side 31 and the master brake cylinder 4 in the valve side 26.

Three of the receptacles 22' for the outlet valves 22 are provided side by side on an imaginary straight line parallel to the upper side Slat the height of the master brake cylinder bore 4' in the valve side 26 of the hydraulic block 25. These three receptacles 22' for the outlet valves 22 are disposed in an axial plane of the master brake cylinder bore 4' or in a plane parallel to the axial plane of the master brake cylinder bore 4' that intersects the master brake cylinder bore 4'. A first or last receptacle 22' for an outlet valve 22 is provided in the valve side 26 of the hydraulic block 25 offset in the direction of the upper side 31 of the hydraulic block 25. The receptacle 22' closest to the fastening side 46 is offset to the other three receptacles 22' for the outlet valves 22. The receptacles 21' for the inlet valves 21 and the receptacles 22' for the outlet valves 22 for a respective wheel brake 2 are offset to one another in pairs, i.e. perpendicular to the upper side 31 or parallel to the fastening side 46 of the hydraulic block 25.

For each master brake cylinder piston 53, the master brake cylinder bore 4' comprises two peripheral sealing grooves 54 in which piston seals (sealing rings) 55 are disposed. The sealing grooves 54 have only a small axial distance to one another that is approximately as large as the sealing grooves 54 are wide. The three receptacles 22' for the outlet valves 22 provided at the height of the master brake cylinder bore 4' communicate directly with the master brake cylinder bore 4' through lines that lead coaxially through a base of the receptacles 22' radially or in a secant direction into the master brake cylinder bore 4'. One of the receptacles 22' for one of the outlet valves 22 between two of the sealing grooves 54 is connected to the master brake cylinder bore 4'.

A receptacle 13' for the test valve 13 is provided in the valve side 26 of the hydraulic block 25 between the receptacles 22' for the outlet valves 22 that are offset relative to the others and the fastening side 46 of the hydraulic block 25.

A flat counterbore is provided in the valve side 26 of the hydraulic block 25 in a center between the receptacles 22' for the outlet valves 22 as a receptacle 24' for the pressure sensor 24 for the cylinder 18 of the power brake pressure generator 5. It communicates via a coaxial bore in its base with the line 20 that leads from the center connector 29 for the brake fluid reservoir 12 to the cylinder 18 of the power brake pressure generator 5.

A receptacle 23' for the pressure sensor 23 of the master brake cylinder 4 is provided in the valve side 26 of the hydraulic block 25 slightly below the master brake cylinder bore 4' and near its closed end. The receptacle 23' for the pressure sensor 23 communicates directly with the master brake cylinder bore 4' via a line that extends coaxially through the base of the receptacle 23' in a secant direction into the master brake cylinder bore 4'.

A receptacle 6' for one of the two separator valves 6 is provided in the valve side 26 of the hydraulic block 25 between the receptacle 23' for the pressure sensor 23 of the master brake cylinder 4 and the cylinder 18 of the power brake pressure generator 5. The receptacle 6' for the other power valve 6 is provided in the valve side 26 of the hydraulic block 25 on an opposite side of the cylinder 18 of the power brake pressure generator 5 between the cylinder 18 and the fastening side 46 of the hydraulic block 25.

Receptacles 7' for the power valves 7 are provided in the valve side 26 of the hydraulic block 25 on opposite sides of the cylinder 18 of the power brake pressure generator 5. One of the two receptacles 7' is located between the receptacle 23' for the pressure sensor 23 of the master brake cylinder 4 and the other receptacle 7' on the opposite side of the cylinder 18 between said cylinder and the fastening side 46 of the hydraulic block 25. The two receptacles 7' for the power valves 7 communicate with the cylinder 18 of the power brake pressure generator 5 via a line 52 that extends through the hydraulic block 25 parallel to the upper side 31 and perpendicular to the fastening side 46 of the hydraulic block 25.

A receptacle 8' for the simulator valve 8 is located between the receptacle 23' for the pressure sensor 23 of the master brake cylinder 4 and the cylinder bore 28 of the pedal travel simulator 11 offset to the cylinder bore 28 in the direction of the side 38 of the hydraulic block 25 comprising the depression 37.

The invention claimed is:

1. A cuboid hydraulic block for a hydraulic unit of a brake pressure control mechanism of a hydraulic vehicle brake system, the hydraulic block comprising:
   a valve side which adjoins an upper side of the hydraulic block, and in which receptacles for solenoid valves of the brake pressure control mechanism are disposed, wherein receptacles for inlet valves of the brake pressure control mechanism and/or receptacles for outlet valves of the brake pressure control mechanism are disposed in the valve side of the hydraulic block in a longitudinal direction of the upper side of the hydraulic block and offset transverse to the upper side of the hydraulic block,
   wherein at least one connector for a brake fluid reservoir is hydraulically connected to a cylinder of a power brake pressure generator via a line extending through the hydraulic block with at least one bend, wherein the line leads axially parallel to the cylinder and opens into a peripheral groove in the cylinder of the power brake pressure generator.

2. The hydraulic block according to claim 1, wherein the receptacles for the inlet valves are disposed side by side in the longitudinal direction of the upper side of the hydraulic block in the valve side of the hydraulic block alternately offset transverse to the upper side of the hydraulic block and/or a receptacle for an outlet valve of the outlet valves is disposed in the valve side of the hydraulic block transverse to the upper side of the hydraulic block relative to other receptacles for the outlet valves.

3. The hydraulic block according to claim 1, wherein the receptacles for the inlet valves and the receptacles for the outlet valves are disposed in respective pairs perpendicular to the upper side and/or parallel to a fastening side of the hydraulic block offset to one another in the valve side of the hydraulic block.

4. The hydraulic block according to claim 1, further comprising:
   a master brake cylinder bore;
   wherein a receptacle for an outlet valve is disposed in an axial plane of the master brake cylinder bore or in a plane parallel to the axial plane of the master brake cylinder bore that intersects the master brake cylinder bore.

5. The hydraulic block according to claim 1, further comprising:
   a master brake cylinder bore with two peripheral sealing grooves for piston seals for a master brake cylinder piston;
   wherein a receptacle for an outlet valve communicates directly with the master brake cylinder bore through a line which leads coaxially through a base of the receptacle radially or in a secant direction between the two sealing grooves into the master brake cylinder bore.

6. The hydraulic block according to claim 1, further comprising:
   a receptacle for a power valve in the valve side perpendicular to the upper side and/or parallel to the fastening side of the hydraulic block offset to a receptacle for an inlet valve and/or to a receptacle for an outlet valve.

7. The hydraulic block according to claim 1, further comprising:
   two receptacles for two power valves in the valve side on either side next to a cylinder of a power brake pressure generator, which are connected to the cylinder by a line that extends in the hydraulic block perpendicular to a fastening side of the hydraulic block and/or parallel to the upper side of the hydraulic block.

8. The hydraulic block according to claim 1, further comprising:
   a receptacle for a pressure sensor for a power brake pressure generator in the valve side on a side of the receptacles for the inlet valves facing away from the upper side of the hydraulic block and/or between the receptacles for the outlet valves.

9. The hydraulic block according to claim 1, further comprising:
   a cylinder for a power brake pressure generator; and
   a connector for a brake fluid reservoir in the upper side, from which a line extends in a direction of the cylinder of the power brake pressure generator which merges into a line parallel to the cylinder of the power brake pressure generator that opens into the cylinder of the power brake pressure generator with a bend, through a recess.

10. The hydraulic block according to claim 1, further comprising:
    three connectors for a brake fluid reservoir in the upper side, a central connector of the three connectors communicating with the cylinder of a piston cylinder unit of the power brake pressure generator in the hydraulic block.

11. The hydraulic block according to claim 1, wherein, in a side adjoining the upper side and the valve side, the hydraulic block includes a depression which reaches the upper side for fastening a brake fluid reservoir to the upper side of the hydraulic block.

12. The hydraulic block according to claim 1, further comprising:
    a master brake cylinder bore;
    a position indicator bore parallel to the master brake cylinder bore for a position indicator for a master brake cylinder piston; and
    a receptacle for a displacement or position sensor, which is disposed at a distance of no more than a thickness of the hydraulic block perpendicular to the valve side from a fastening side adjoining the upper side and the valve side of the hydraulic block and/or from the upper side of the hydraulic block.

* * * * *